United States Patent [19]

Scholz

[11] 4,199,233

[45] Apr. 22, 1980

[54] FEED SHUTTLE MECHANISM FOR MOTION PICTURE FILM STRIPS

[75] Inventor: Donald T. Scholz, Wayland, Mass.

[73] Assignee: Polaroid Corporation, Cambridge, Mass.

[21] Appl. No.: 950,674

[22] Filed: Oct. 12, 1978

Related U.S. Application Data

[63] Continuation-in-part of Ser. No. 756,330, Jan. 3, 1977, abandoned.

[51] Int. Cl.² ............................................. G03B 1/22
[52] U.S. Cl. .................................... 352/194; 226/62; 226/70
[58] Field of Search ............... 352/191, 192, 193, 194, 352/195, 196; 226/62, 70

[56] References Cited

U.S. PATENT DOCUMENTS

| 2,712,771 | 7/1955 | Isom | 352/194 |
| 2,733,633 | 2/1956 | Wottring | 352/192 |
| 3,410,639 | 11/1968 | Chandler | 352/194 |
| 3,580,668 | 5/1971 | Claar | 352/194 |

Primary Examiner—Monroe H. Hayes
Attorney, Agent, or Firm—Frederick A. Goettel, Jr.

[57] ABSTRACT

A film strip feed shuttle mechanism in which a film engaging claw is supported laterally of an elongated, transversely arcuate body member adapted to be driven by a single compound cam for both longitudinal reciprocation and oscillatory rotation on an axis established by bearing blocks in radially opposite quadrants at opposite ends of the body. The shuttle is supported by tension springs retaining the body member against the bearing blocks and compound driving cam.

13 Claims, 7 Drawing Figures

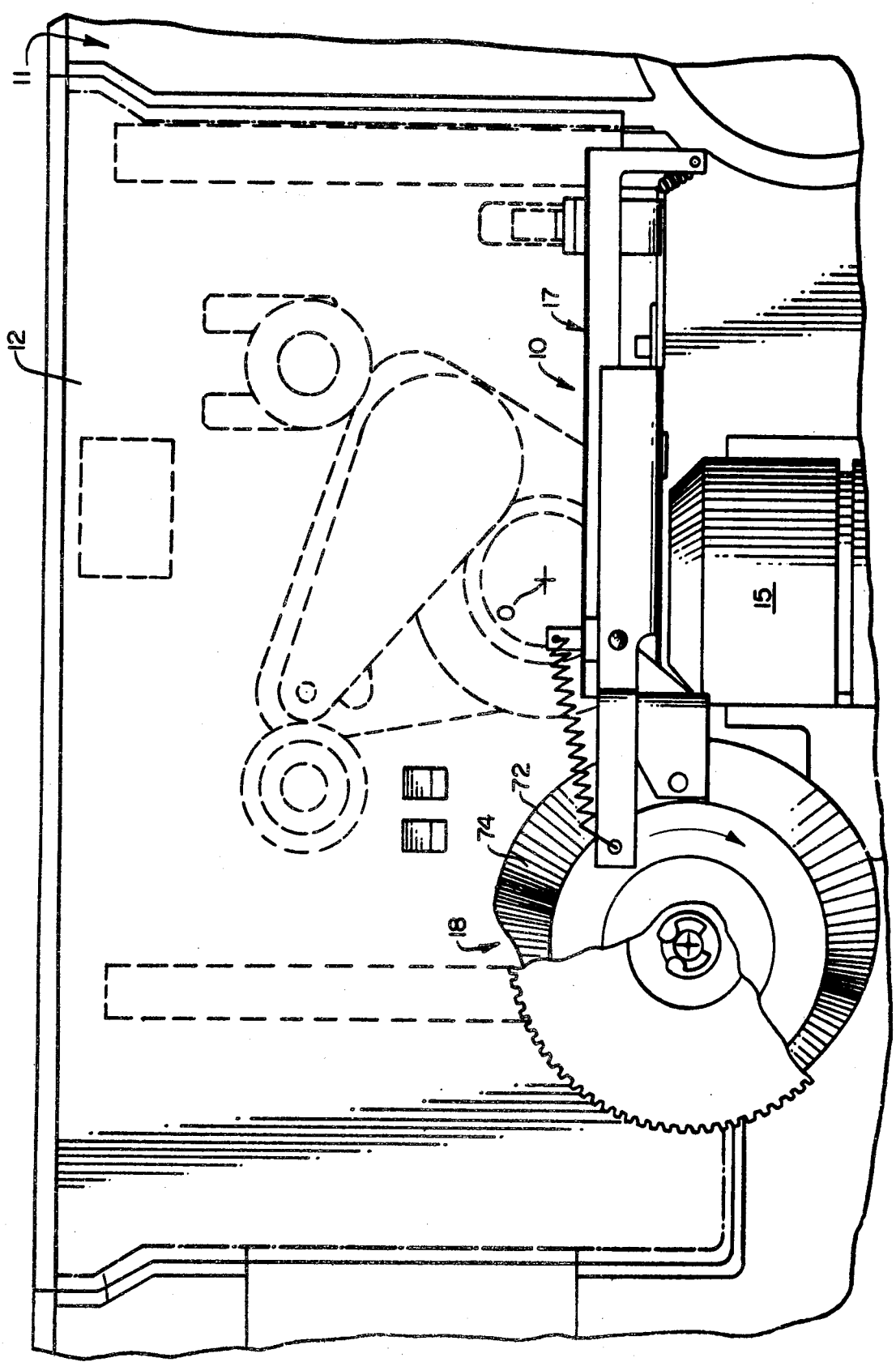
FIG. I.

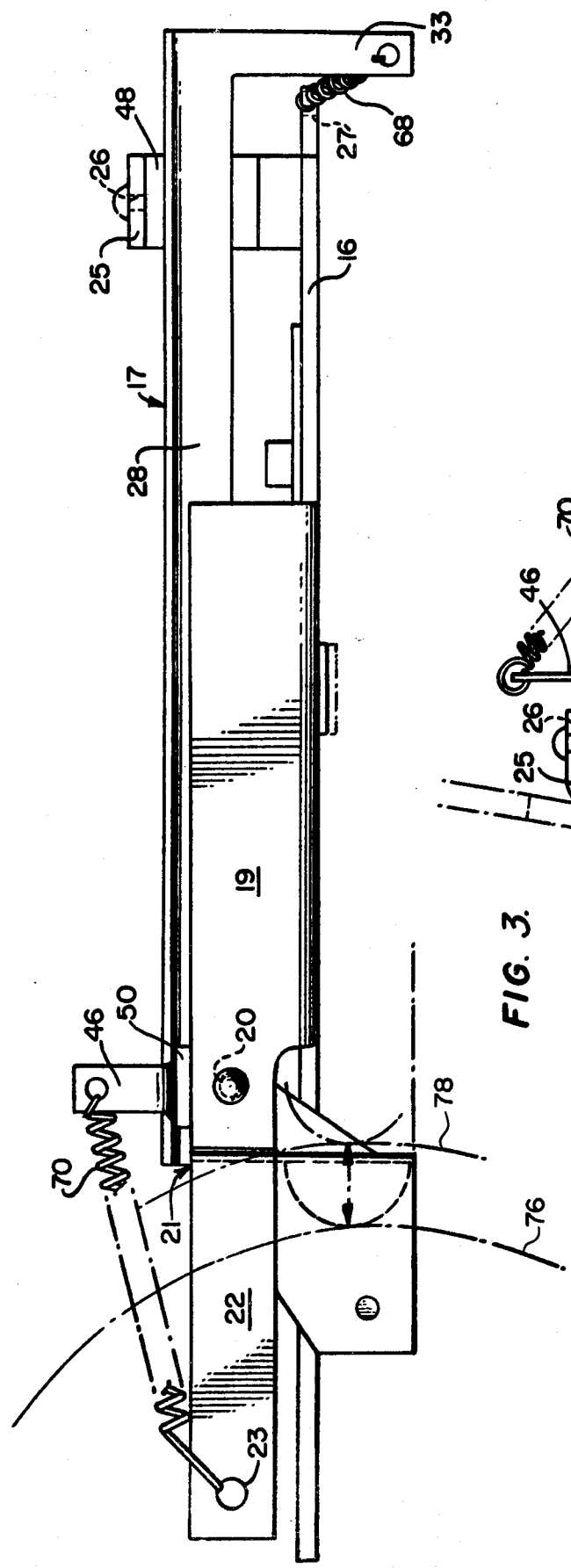
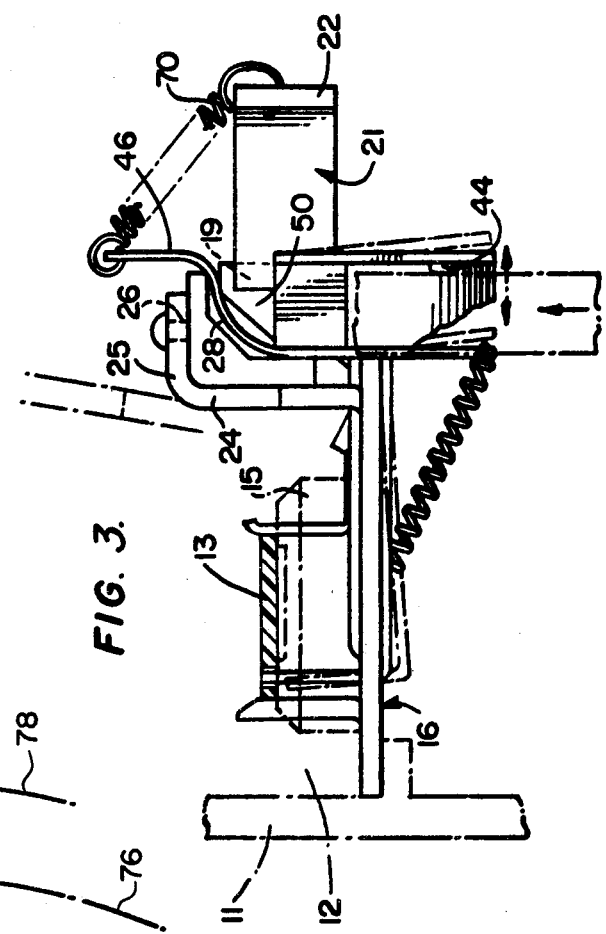

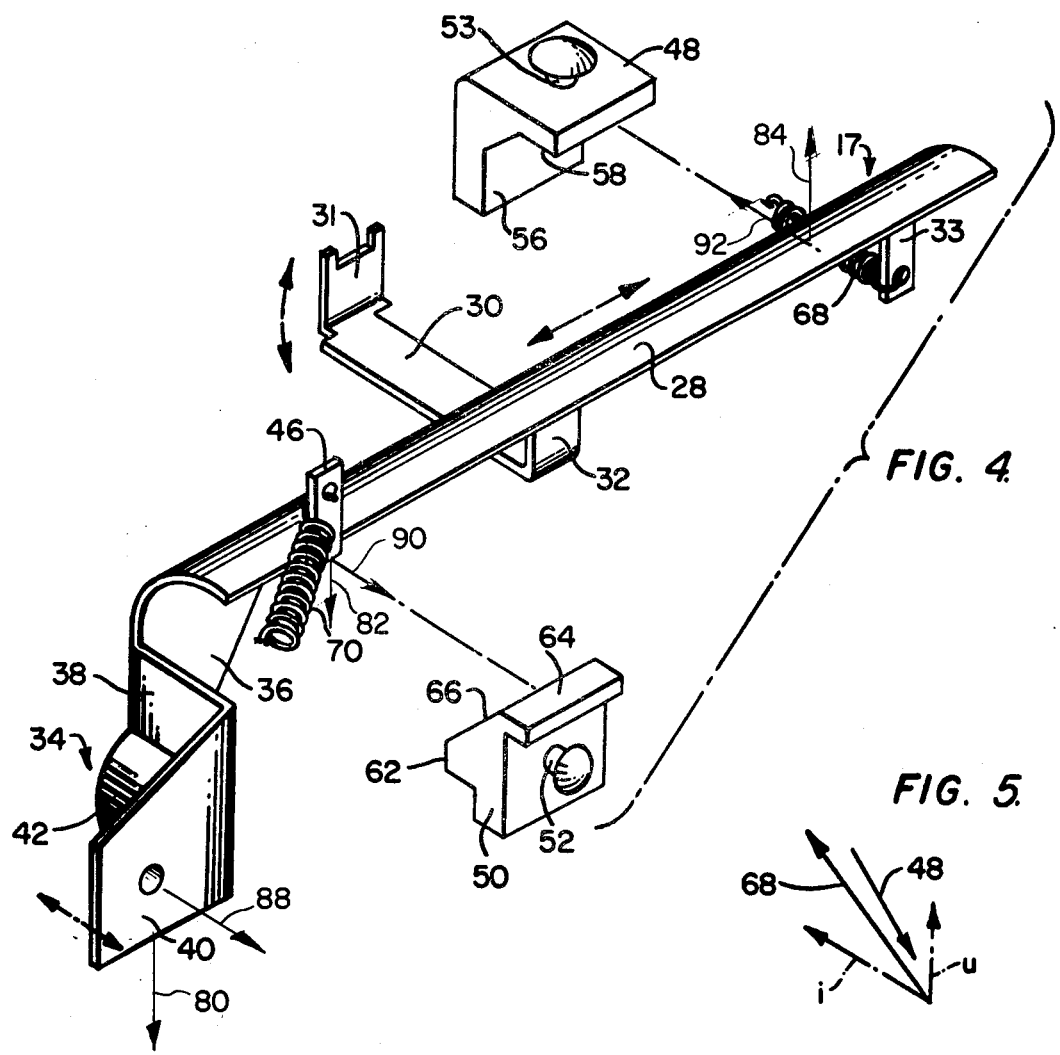
FIG. 4.
FIG. 5.
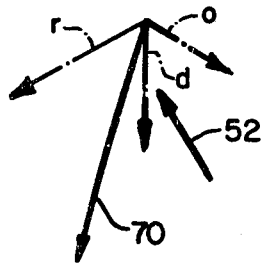
FIG. 6.
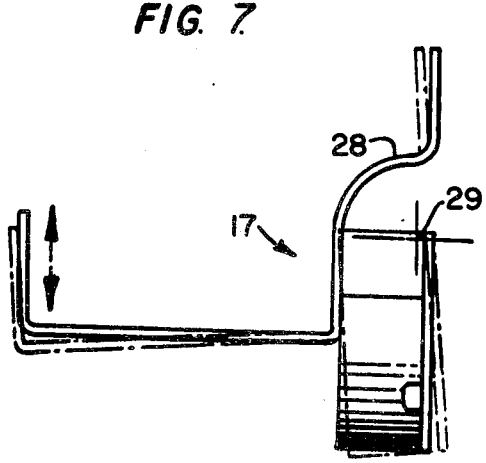
FIG. 7.

FEED SHUTTLE MECHANISM FOR MOTION PICTURE FILM STRIPS

CROSS-REFERENCE TO RELATED APPLICATION

This application is a continuation-in-part of U.S. patent application Ser. No. 756,330, filed 1-3-77 now abandoned.

BACKGROUND OF THE INVENTION

This invention relates to motion picture film projection and, more particularly, it concerns an improved feed shuttle mechansim for incrementally advancing a film strip to present successive image frames thereon to a framing window or the like for the projection of light through the film to an optical system for viewing.

The projection for viewing of motion picture film strips requires that each successive image frame on the film strip be presented in a momentarily still position in registry with a framing aperture through which light is transmitted to present the image on a screen or the like. For this reason, the film is provided with a series of equally spaced feed apertures along at least one marginal edge to be engaged by a feed shuttle claw capable of movement normal to the film strip to engage the spaced apertures, parallel to the plane of the strip to advance it an increment of distance equal to the length of one frame, withdraw from the apertures and return for successive feed cycles. Because of the speeds at which such a shuttle is operated, the compound nature of the feed shuttle claw movement, together with the requirements for precision and synchronization with other projector components, the feed shuttle represents perhaps the most sophisticated mechanical organization in a motion picture projector. As a result, numerous feed shuttle designs have evolved out of the continuing effort to simplify feed shuttle mechanisms while retaining or improving upon the operational characteristics thereof.

SUMMARY OF THE INVENTION

In accordance with the present invention, an improved feed shuttle mechanism for incrementally advancing a motion picture film strip is provided particularly, though not exclusively for use in viewer apparatus of the type equipped to handle cassette contained film strips. The film engaging claw of the shuttle is supported in lateral cantilevered fashion centrally along the length of an elongated, transversely arcuate body member adapted to be driven by a single compound cam for both reciprocation in a longitudinal direction parallel to the direction of film strip advance and rotationally such that the laterally extending claw undergoes the appropriate vertical movement for engaging entry and disengaging withdrawal of successive film strip feed apertures. The body and claw portions of the shuttle may be formed as a single metal stamping requiring a minimum of precision machining as a result of supporting the shuttle exclusively by a pair of longitudinally spaced strings adapted to retain the arcuate body against quadrant bearing blocks located at opposite ends of the body in the vicinity of the spring supports as well as against the actuating cam. The lateral extension of the claw portion contributes not only to the required compound movement of the shuttle but also enables the shuttle to be mounted along the exterior structure adapted to receive a cassette in which the film strip is contained.

Accordingly, among the objects of the present invention are: the provision of an improved motion picture film strip feed shuttle mechanism; the provision of such a mechanism which is totally spring supported against bearing guide surfaces; the provision of such a feed shuttle which enables the use of a multi-tang claw capable of engaging simultaneously two or more film strip feed apertures; the provision of such a feed shuttle which may be economically produced from a single stamping of sheet metal; and the provision of such a feed shuttle which may be conveniently mounted in a cassette receiving projector/viewing apparatus without compromise in precise registration with related viewer components.

An additional significant object of the present invention is to provide a motion picture film strip shuttle mechanism wherein the arrangement of the feed shuttle and its supporting surfaces is such that the frictional forces resulting from the operational engagement of the feed shuttle camming surfaces with its actuating compound cam are such that these forces will bias the shuttle into positive engagement with each of the shuttle supporting surfaces thereby promoting smooth, quiet, uniform operation of the shuttle throughout its path of operation.

Other objects and further scope of applicability will become apparent from the detailed description to follow taken in conjunction with the accompanying drawings in which like parts are designated by like reference numerals.

BRIEF DESCRIPTION OF THE DRAWINGS

FIG. 1 is a fragmentary side elevation illustrating the feed shuttle of the invention incorporated in a viewing apparatus adapted to receive cassette contained film strips;

FIG. 2 is an enlarged side elevation of the feed shuttle and supporting structure;

FIG. 3 is an end view of the organization illustrated in FIG. 2;

FIG. 4 is an exploded perspective view of the feed shuttle of the invention;

FIG. 5 is a force vector diagram depicting the spring support on one end of the feed shuttle;

FIG. 6 is a similar force vector diagram illustrating the orientation of a spring support on the other end of the feed shuttle; and FIG. 7 is an end view of the feed shuttle depicting operating motion thereof.

DETAILED DESCRIPTION OF THE PREFERRED EMBODIMENT

In FIGS. 1–3 of the drawings, the film strip feed shuttle mechanism of the present invention is generally designated by the reference numeral 10 and shown in an operative position relative to interior components of a motion picture viewing or projection apparatus in which the mechanism is particularly though not exclusively adapted for use. Since a detailed description of viewing apparatus components is unnecessary for a full understanding of the feed shuttle mechanism 10 to which the invention is related, such components are only generally shown to include a chassis wall 11 defining a film cassette well 12 arranged so that projection light directed on an axis O will pass through a cassette contained motion picture film strip 13 and downwardly through a lens 14 to be projected as motion picture images. Although the film strip 13 to be projected in the viewing apparatus is preferrably contained within a cassette (not shown) it will suffice for purposes of the present invention to note that the film strip will be positioned by the cassette and cassette well 12 to overlie an aperture block 15 supported by a stamped metal foundation plate 16 defining the floor of the cassette well 12. Also for purposes of directional reference, it may be assumed that the film strip 13 will be fed incrementally in a forward direction proceeding from left to right in the context of FIG. 1. Also the terms "front" and "rear" will be used hereinafter in the description of various feed shuttle structure and operation, it being understood that front corresponds to the forward direction of film strip feed whereas rear implies the opposite direction.

The mechanism 10 includes as a single moving component, a feed shuttle element 17 adapted to be driven by a rotatable cam 18 relative to fixed viewing apparatus or, more specifically, cassette well carried components providing the needed support for the shuttle 17. In this context, the foundation plate 16 is shaped to include a vertical flange 19 having an aperture 20 therein and joining at its rear end with an L-shaped portion 21 to establish a laterally displaced, rearwardly extending supporting tab 22 having an aperture 23 formed therein. At the front right corner of the foundation plate, an inverted L-shaped bracket formation 24 is provided to establish the laterally projecting horizontal supporting tab 25 having an aperture 26 therein. An aperture 27 is located near the front end of the plate 16 to be exposed on the external underside of the cassette well 12. It will be noted further in FIGS. 2 and 3 that the flange 19 projects laterally beyond the bracket 24 and terminates at a front end spaced longitudinally from the bracket 24.

As shown most clearly in FIGS. 4 and 7, the shuttle 17 if formed with an elongated body portion 28 having an arcuate cross-section extending through a quandrant of a circle concentric with the longitudinal axis 29 of the shuttle. An arm 30 supporting a claw 31 is integral with the body through a depending flanged leg 32 joining as a tangent with the lower edge of the transversely arcuate body 28. A depending tab 33 extends similarly in tangential fashion from the lower edge of the body 28 at the front end thereof. The rear end of the body is provided with a cam follower bracket 34 formed as a double bent extension of a depending tangential web 36. The bracket 34 includes a normal flange 38 joining with an axial flange or tab 40. The normal flange 38 supports a peripheral cam follower 42 in a position to underlie the body 28. A radial cam follower bump 44 is formed in the tab 40 on the side thereof adjacent the peripheral cam follower 42 and under the axis 29. An aperture spring tab 46 is struck upwardly from the upper edge of the transversely arcuate body portion 28.

The shuttle 17 is supported for both reciprocable and rotational motion on the axis 29 and with respect to the foundation plate 16 by a pair of longitudinally spaced, inner and outer bearing blocks 48 and 50 respectively. The blocks are molded from low friction material, such as a synthetic resinous material sold under the trademark "Delrin AF" and are shaped for attachment to the foundation plate 16 by projecting post formations 52 and 53 adapted to extend through the apertures 20 and 26, respectively, in the flange 19 and tab 25. After insertion through the apertures, the post formations are deformed ultrasonically to provide the headed formations shown.

The front or inner bearing block 48 is formed with a pair of perpendicular bearing surfaces 56 and 58 to engage and cradle the convex surface of the arcuate shuttle body 28. The outer and rear bearing block 50 is provided with external bearing surfaces 62 and 64 joined by a chamfered surface 66 to engage the inner concave arcuate surface of the body 28.

To retain the shuttle 17 against the respective bearing blocks 48 and 50, a pair of tension springs 68 and 70 are employed. As will be seen in FIGS. 2-6, the spring 68 at the front of the shuttle extends from an aperture near the bottom of the depending tab 33 back to the aperture 27 in the front of the foundation plate 16 (FIG. 2). The axis of tension spring 68 is therefore essentially inwardly toward the block 48 and upwardly against the bearing surfaces 56 and 58. In the vector diagram of FIG. 5, the spring 68 and block 48 are represented by solid line arrows whereas the force vector components acting on the tab 33 are represented by arrows i and u.

The spring 70 extends between the upstanding tab 46 on the shuttle body 28 rearwardly, outwardly and downwardly to the tab 22 formed on the foundation plate 16. The spring 70, therefore, not only biases the rear end of the shuttle body against the respective bearing surfaces of the outer bearing block 50 but also, exerts a major force component rearwardly to retain the cam follower 42 against a peripheral cam surface 72 on the shuttle drive cam 18. The force components acting on the tab 46 are represented in FIG. 6 by the arrows d, o and r.

The drive cam 18, as shown in FIG. 1, is formed with both a peripheral camming surface 72 and a radial cam surface 74 for engagement respectively with the peripheral cam follower 42 and the radial cam follower or bump 44 formed in the follower bracket 34 at the rear end of the shuttle body 28. The bump 44 will be biased against the radial cam surface 74 as a result of both tension in the spring 68 at the forward end of the shuttle body and the outer component of force o acting about the fixed bearing block 50 at the rear end of the shuttle body. This latter biasing force will be appreciated by reference particularly to FIG. 3 of the drawings wherein the pivot moment about the block 50 exerted by the spring 70 will be seen to urge the button 44 to the left or in a direction against the radial cam surface 74.

It should be appreciated that the system for support of the feed shuttle 17 described hereinabove provides for support of the shuttle by contact of the elongated body 28 of the shuttle at only two areas or location of support contact, i.e., in the region of the inner support block 48 and in the region of the outer support block 50 at the opposite end of shuttle 17. As set forth above, the shuttle 17 is urged into supporting and sliding contact with the respective support surfaces of the blocks 48 and 50 by the biasing forces of the pair of support springs 68 and 70. In addition to the force of the above-mentioned springs urging the shuttle into the desired contact with the support blocks, the compound cam 18 and its peripheral cam surface 72 and radial cam surface 74 is arranged so that the engagement of the cam surfaces 72 and 74 with their respective cam followers 42 and 44 will further serve to maintain the desired orientation of the feed shuttle element 17 with respect to its longitudinal axis 29 and the support blocks or location. Such interaction between the compound cam surfaces and their respective cam followers will now be described in detail.

As has been briefly set forth hereinabove, the cam faces 72 and 74 of the compound cam 18 are configured to cooperate with their respective cam followers 42 and 44 in a manner resulting in engagement of the feed shuttle claw 31 with the perforated film strip and subsequent advancement of the feed shuttle along its longitudinal axis to advance the film strip and to further rotate the claw 31 out of engagement with the film strip whereupon the feed shuttle assembly 17 returns to its initial position for another such cycle. The position of the feed shuttle 17 at the extreme limits of its rotational motion about the axis 29, i.e., into and out of engagement with the film strip 13 is illustrated in both FIGS. 3 and 7. Similarly, the position of the feed shuttle 17 at the extreme limits of its axial motion along the axis 29 is illustrated in FIG. 3 with reference to the phantom line showings 76 and 78 of the peripheral camming surface 72. It should be appreciated that the rotational direction of the compound cam 18 is in a clockwise direction as viewed in FIG. 1.

With the above-described interrelationships in mind, reference is now made to FIG. 4 where the forces developed between the camming surfaces 72 and 74 of the compound cam 18 and the cam follower surfaces 42 and 44 of the feed shuttle are illustrated. Looking first at the forces developed between the peripheral cam 72 and its follower surface 42, it will be seen that during the operation, three components develop a substantially downward force component acting upon the cam follower surface 42 and represented by the force vector 80 in FIG. 4. By virtue of the two location support arrangement of the feed shuttle 17, it will be appreciated that the downward force vector 80 will cause the feed shuttle itself to react in effect as a lever resulting in a downward force component 82 between the inner concave surface of the feed shuttle body 28 and its respective supporting block 50, and similarly, an upward force component is present at the opposite end of the feed shuttle body 28 as represented by the force vector 84. Accordingly, it should be appreciated that the downward force 80 developed at the peripheral cam follower interface results in a positive tendency for the feed shuttle 17 to in effect rotate into contact with the supporting surfaces of the shuttle bearing blocks.

In a like manner, the interaction between the face cam follower 44 and the face cam 74 of the compound cam 18 results in a force 88, again shown in FIG. 4, in this case perpendicular to the force developed between the peripheral cam and its follower. Again, as described above, this force results in an identical tendency for the feed shuttle 17 to rotate into engagement with the respective bearing surfaces provided by the bearing blocks 48 and 50. Such forces are represented by the force vectors 90 and 92 in FIG. 4. Accordingly, it should be appreciated that the above-described benefits of the shuttle arrangement are derived specifically from the unique two location mounting or support concept of the present invention and the fact that the driving or displacing cam interfaces are located axially displaced from the support locations so that the frictional forces generated at the cam interfaces during shuttle operation may be utilized to assure bearing contact and accordingly smooth, jitter free, silent operation of the feed shuttle system.

It is to be noted that the material from which the bearing blocks 48 and 50 is formed, "Delrin AF", is a moldable material internally lubricated with teflon. The cam 18 is preferrably molded from a polycarbonate resin internally lubricated with approximately 2% silicone and 13% teflon. The use of such materials facilitates the formation of the entire feed shuttle 17, including the cam follower formations 42 and 44, as a single or integral metal stamping. Moreover, the precision machining required in the manufacture of the shuttle is reduced to the formation of the feed claw 31, and perhaps limiting burnishing of the portions of the arcuate body portion 28 which engages the bearing blocks 48 and 50.

Thus, it will be appreciated that as a result of the present invention, an extremely simple yet highly effective motion picture film strip feed shuttle mechanism is provided and by which the above-mentioned objectives are completely fulfilled. Also, it will be apparent to those skilled in the art that modifications may be made in the embodiment described herein and illustrated in the accompanying drawings without departure from the inventive concepts manifested by the disclosed embodiment. Accordingly, it is expressly intended that the foregoing description and illustration in the accompanying drawings is exemplary of a preferred embodiment only, not limiting, and that the true spirit and scope of the present invention be determined by reference to the appended claims.

What is claimed is:

1. A mechanism for incrementally advancing a film strip having uniformly spaced apertures along the length thereof, said mechanism comprising:
   an elongated body member having a longitudinal axis;
   a film aperture engaging claw supported by said body member laterally of said axis for movement with said body member in relation to said axis;
   means for supporting said elongated body member with said longitudinal axis parallel to the direction of film feed including bearing means for engaging said elongated member at two support locations spaced at opposite axial ends of said elongated body member and in opposite radial quadrants concentric with said axis, and spring means for yieldably retaining said body member into engagement with each of said support locations whereby said body member is restrained against radial movement with respect to said longitudinal axis; and
   means for reciprocating said body member with respect to said axis through repeated cycles, each cycle including advance and retract strokes, and for rotating said body member about said longitudinal axis to move said claw to a film aperture engaging position during said advance stroke and to a retracted disengaged position during said retract stroke, said reciprocating and rotating means further acting upon said body member during said repeated cycles to encourage rotation of said body member about an axis perpendicular to said longitudinal axis to assist said spring means in retaining said body member in engagement with each of said support locations.

2. The apparatus recited in claim 1 wherein said body member is arcuate in transverse section to establish oppositely facing convex and concave surfaces, said bearing means comprising longitudinally spaced first and second fixed bearing members to engage said convex and concave surfaces respectively at said two support locations.

3. The apparatus recited in claim 2 wherein said first bearing member includes a pair of mutually perpendicular interior bearing surfaces formed thereon and wherein said second bearing member includes a pair of mutually perpendicular exterior bearing surfaces formed thereon.

4. The apparatus recited in claim 2 wherein said positioning means comprises a first tab depending from said body member in a first direction and a second tab depending from said body member in another direction and said spring means comprises first and second independently operating springs connected to said first and second tabs, respectively.

5. The apparatus recited in claim 4 wherein said first tension spring extends in the direction to exert an upward, forward and inward bias of said body member into engagement with said first bearing member and wherein said second tension spring is oriented to exert a downward, rearward and outward biasing force of said body member against said second bearing member.

6. The apparatus recited in claim 1 wherein said reciprocating and rotating means include peripheral and radial cam follower surfaces formed on said body member.

7. The apparatus recited in claim 6 wherein said peripheral and radial cam follower surfaces are positioned below said longitudinal axis.

8. The apparatus recited in claim 6 wherein said reciprocating and rotating means additionally comprise a drive cam having a pair of camming surfaces respectively engaged with said cam follower surfaces, said cam being rotatably mounted with respect to said body member and said camming surfaces at a location such that the frictional forces developed as a result of operational engagement of said camming surfaces with said cam follower surfaces are reacted through said body member to bias said body member into engagement with said bearing means at each of said support locations.

9. The apparatus recited in claim 8 wherein said peripheral and radial cam follower surfaces are each located at a position spaced with respect to said longitudinal axis, axially outwardly from said support locations.

10. The apparatus of claim 9 wherein said drive cam is supported for rotation about an axis perpendicular to a plane containing said longitudinal axis, and said cam faces are located adjacent to and axially spaced from one of said support locations.

11. The apparatus recited in claim 7 wherein said reciprocating and rotating means additionally comprise a drive cam rotatably supported for rotation about an axis perpendicular to a plane containing said longitudinal axis having a pair of camming surfaces respectively engaged with said cam follower surfaces.

12. In a motion picture apparatus having a cassette well and a cassette well floor defining a plate having a guide means to orient a cassette contained film strip relative to the plate, a shuttle feed mechanism for incrementally advancing the film strip in a path parallel to the well floor, said mechanism comprising:
an elongated body member having an arcuate transverse cross-section for an arc length approximating a quarter circle concentric with a longitudinal axis of the body member;
means for supporting said elongated body member in a laterally spaced position relative to the film strip and exteriorly of the cassette well, said support means including a first bearing block to engage a convex surface of said transversely arcuate body member, a second bearing block to engage a concave surface of the said transversely arcuate body member at a location spaced from said first bearing block, a first tension spring urging said body member upwardly and inwardly against said first bearing block, a second tension spring urging said body member downwardly and outwardly against said second bearing block;
an arm member portion extending from said body member under the cassette well defining floor plate having on the end thereof an upstanding film strip engaging claw;
means on said body member defining peripheral and radial cam follower surfaces; and
a rotatable drive cam having peripheral and radial camming surfaces respectively operably associated with said peripheral and radial cam follower surfaces to simultaneously reciprocate and rotatably oscillate said body member on said longitudinal axis to cause up and down and back and forth motion in said feed claw, one of said springs also biasing said peripheral and radial cam surfaces against said drive cam, said rotatable drive cam and said peripheral and radial cam follower surfaces being positioned with respect to said longitudinal axis such that the frictional forces developed as a result of operational engagement of said camming surfaces with said cam follower surfaces are reacted through said body member to bias said body member into engagement with said bearing means at each of said first bearing block and said second bearing block.

13. The apparatus of claim 12 wherein said peripheral and radial cam follower surfaces are each located at a position spaced axially outward from the location wherein said second bearing block engages said concave surface of said transversely arcuate body member.

* * * * *